(12) United States Patent
Hallum

(10) Patent No.: US 6,455,181 B1
(45) Date of Patent: Sep. 24, 2002

(54) FUEL CELL SYSTEM WITH SENSOR

(75) Inventor: Ryan Patrick Hallum, Latham, NY (US)

(73) Assignee: Plug Power, Inc., Latham, NY (US)

( * ) Notice: Subject to any disclaimer, the term of this patent is extended or adjusted under 35 U.S.C. 154(b) by 0 days.

(21) Appl. No.: 09/540,673

(22) Filed: Mar. 31, 2000

(51) Int. Cl.[7] .............................................. H01M 8/04
(52) U.S. Cl. ........................................... 429/13; 429/22
(58) Field of Search ............................. 429/13, 22, 23, 429/25, 12

(56) References Cited

U.S. PATENT DOCUMENTS

| | | | |
|---|---|---|---|
| 4,324,761 A | 4/1982 | Harris | 422/98 |
| 4,373,375 A | 2/1983 | Terhune et al. | 73/19 |
| 4,620,914 A | 11/1986 | Abens et al. | 204/265 |
| 4,664,757 A | 5/1987 | Zupancic et al. | 204/1 T |
| 4,689,122 A | 8/1987 | Polak et al. | 204/1 T |
| 4,795,536 A | 1/1989 | Young et al. | 204/128 |
| 4,797,185 A | 1/1989 | Polak et al. | 204/129 |
| 4,824,528 A | 4/1989 | Polak et al. | 204/1 T |
| 4,879,005 A | 11/1989 | Fray et al. | 204/1 T |
| 4,886,048 A | 12/1989 | Labaton et al. | 165/104.27 |
| 4,921,651 A | 5/1990 | Polak et al. | 264/41 |
| 4,950,371 A | 8/1990 | McElroy | 204/129 |
| 5,012,672 A | 5/1991 | McKee | 73/31.07 |
| 5,122,239 A | 6/1992 | McElroy et al. | 204/101 |
| 5,256,443 A | 10/1993 | Tomita | 427/125 |
| 5,338,708 A | 8/1994 | Felten | 501/19 |
| 5,367,283 A | 11/1994 | Lauf et al. | 338/34 |
| 5,451,920 A | 9/1995 | Hoffheins et al. | 338/34 |
| 5,505,824 A | 4/1996 | McElroy | 205/337 |
| 5,520,789 A | 5/1996 | Takahashi et al. | 204/424 |
| 5,670,115 A | 9/1997 | Cheng et al. | 422/90 |
| 5,886,614 A | 3/1999 | Cheng et al. | 338/34 |

FOREIGN PATENT DOCUMENTS

JP         5-275097         * 10/1993

* cited by examiner

Primary Examiner—Stephen Kalafut
Assistant Examiner—Jonathan Crepeau
(74) Attorney, Agent, or Firm—Fish & Richardson, P.C.

(57) ABSTRACT

A fuel cell system having one or more sensors is disclosed. The sensor(s) can detect the difference in the content of a gas (e.g., hydrogen) in an inlet stream and an outlet stream of the fuel cell system. The sensors can provide a signal to a controller that regulates the flow of the detected gas in the inlet stream.

24 Claims, 9 Drawing Sheets

FUEL CELL SYSTEM WITH SENSOR

BACKGROUND

A fuel cell can convert chemical energy to electrical energy by promoting a chemical reaction between two gases.

One type of fuel cell includes a cathode flow field plate, an anode flow field plate, a membrane electrode assembly disposed between the cathode flow field plate and the anode flow field plate, and two gas diffusion layers disposed between the cathode flow field plate and the anode flow field plate. A fuel cell can also include one or more coolant flow field plates disposed adjacent the exterior of the anode flow field plate and/or the exterior of the cathode flow field plate.

Each flow field plate has an inlet region, an outlet region and open-faced channels connecting the inlet region to the outlet region and providing a way for distributing the gases to the membrane electrode assembly.

The membrane electrode assembly usually includes a solid electrolyte (e.g., a proton exchange membrane, commonly abbreviated as a PEM) between a first catalyst and a second catalyst. One gas diffusion layer is between the first catalyst and the anode flow field plate, and the other gas diffusion layer is between the second catalyst and the cathode flow field plate.

During operation of the fuel cell, one of-the gases (the anode gas) enters the anode flow field plate at the inlet region of the anode flow field plate and flows through the channels of the anode flow field plate toward the outlet region of the anode flow field plate. The other gas (the cathode gas) enters the cathode flow field plate at the inlet region of the cathode flow field plate and flows through the channels of the cathode flow field plate toward the cathode flow field plate outlet region.

As the anode gas flows through the channels of the anode flow field plate, the anode gas passes through the anode gas diffusion layer and interacts with the anode catalyst. Similarly, as the cathode gas flows through the channels of the cathode flow field plate, the cathode gas passes through the cathode gas diffusion layer and interacts with the cathode catalyst.

The anode catalyst interacts with the anbode gas to catalyze the conversion of the anode gas to reaction intermediates. The reaction:intermediates include ions and electrons. The cathode catalyst interacts with the cathode gas and the reaction intermediates to catalyze the conversion of the cathode gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate.

Because electrons are formed at the anode side of the membrane electrode assembly, that means the anode gas undergoes oxidation during the fuel cell reaction. Because electrons are consumed at the cathode side of the membrane electrode assembly, that means the cathode gas undergoes reduction during the fuel cell reaction.

For example, when hydrogen and oxygen are the gases used in a fuel cell, the hydrogen flows through the anode flow field plate and undergoes oxidation. The oxygen flows through the cathode flow field plate and undergoes reduction. The specific reactions that occur in the fuel cell are represented in equations 1–3.

$$H_2 \rightarrow 2H^+ 2e^{31} \tag{1}$$

$$\tfrac{1}{2}O_2 + 2H^+ + 2e^- \rightarrow H_2O \tag{2}$$

$$H_2 + \tfrac{1}{2}O_2 \rightarrow H_2O \tag{3}$$

As shown in equation 1, the hydrogen forms protons ($H^+$) and electrons. The protons flow through the electrolyte to the cathode side of the membrane electrode assembly, and the electrons flow from the anode side of the membrane electrode assembly to the cathode side of the membrane electrode assembly through the external load. As shown in equation 2, the electrons and protons react with the oxygen to,form water. Equation 3 shows the overall fuel cell reaction.

In addition to forming chemical products, the fuel cell reaction produces heat. One or more coolant flow field plates are typically used to conduct the heat away from the fuel cell and prevent it from overheating.

Each coolant flow field plate has an inlet region, an outlet region and channels that provide fluid communication between the coolant flow field plate inlet region and the coolant flow field plate outlet region. A coolant (e.g., liquid de-ionized water) at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

To increase the electrical energy available, a plurality of fuel cells can be arranged in series to form a fuel cell stack. In a fuel cell stack, one side of a flow field plate functions as the anode flow field plate for one fuel cell while the opposite side of the flow field plate functions as the cathode flow field plate in another fuel cell. This arrangement may be referred to as a bipolar plate. The stack may also include monopolar plates such as, for example, an anode coolant flow field plate having one side that serves as an anode flow field plate and another side that serves as a coolant flow field plate. As an example, the open-faced coolant channels of an anode coolant flow field plate and a cathode coolant flow field plate may be mated to form collective coolant channels to cool the adjacent flow field plates forming fuel cells.

SUMMARY

The invention relates to a fuel cell system having a sensor.

The sensor is interfaced with the fuel cell system such that the sensor can detect the concentration of an anode gas (e.g., hydrogen) flowing in the fuel cell inlet and outlet streams. The difference in the anode gas concentration in the streams can be measured and transmitted to a controller. In response to the measured difference, the controller can regulate the flow of the anode gas in the inlet stream (e.g., by changing the position of a valve disposed between the anode gas supply and the fuel cell inlet). This can allow the flow of anode gas from the gas supply to the fuel cell to be regulated according to the amount of anode gas desired to operate the fuel cell. The sensor, for example, can be formed of a membrane electrode assembly (MEA) having a solid electrolyte between two catalyst layers. The MEA can provide a sensor that is simple and inexpensive to produce.

In one aspect, the invention features a fuel cell system that includes a fuel cell, a sensor and a detector. The fuel cell has a flow field plate with an inlet and an outlet. The sensor includes a membrane electrode assembly having a first side in fluid communication with the flow field plate inlet and a second side in fluid communication with the flow field plate outlet. The detector is in electrical communication with the first and second sides of the membrane electrode assembly, and the detector is adapted to detect a difference between the hydrogen concentrations at the first and second sides of the membrane electrode assembly.

Embodiments can include one or more of the following features.

The membrane electrode assembly can be formed of a solid electrolyte disposed between two catalyst layers (e.g., two platinum-containing layers). The membrane electrode assembly can further include two gas diffusion layers, with a gas diffusion layer adjacent the exterior of each of the catalyst layers.

The fuel cell system can further include a fuel supply system (e.g., a reformer) in fluid communication with the flow field plate inlet, and a controller adapted to regulate flow of fuel from the fuel supply system to the flow field plate (e.g., in response to a signal from the sensor). The fuel cell system can also include a valve in fluid communication with the flow field plate inlet (e.g., such that the controller is interfaced with the valve to regulate flow of fuel from the fuel supply system to the inlet of the flow field plate in response to a signal from the sensor).

The fuel cell system can further include one or more additional sensors, which can be connected in series to the first sensor.

The fuel cell system can include an inlet conduit in fluid communication with the flow field plate inlet and an outlet conduit in fluid communication with the flow field plate outlet. The first side of the membrane electrode assembly can define a portion of the inlet conduit, and the second side of the membrane electrode assembly can define a portion of the outlet conduit.

In another aspect, the invention features a fuel cell system that includes a first fuel cell stack, a second fuel cell stack, a sensor and a detector. The first fuel cell stack has a first fuel cell having a first flow field plate with an inlet and an outlet, and the second fuel cell stack has a second fuel cell with a second flow field plate having an inlet and an outlet. The inlet of the first flow field plate is in fluid communication with the inlet of the second flow field plate, and the outlet of the first flow field plate is in fluid communication with the outlet of the second flow field plate. The sensor is formed of a membrane electrode assembly having a first side in fluid communication with the inlets of the first and second flow field plates, and a second side in fluid communication with the outlets of the first and second flow field plate. The detector is in electrical communication with the first and second sides of the membrane electrode assembly, and the detector is adapted to detect a difference in the hydrogen concentrations at the first and second sides of the membrane electrode assembly.

In a further aspect, the invention features a method of regulating a gas flow in a fuel cell system. The method includes contacting an inlet gas stream of the fuel cell with a first side of a membrane electrode assembly, and contacting an outlet gas stream of the fuel cell with a second side of the membrane electrode assembly. The method also includes detecting a difference between a hydrogen concentration at the first side of the membrane electrode assembly and a hydrogen concentration at the second side of the membrane electrode assembly.

The method can further include regulating flow of the inlet gas stream based on the difference in the hydrogen activities of the first and second sides of the membrane electrode assembly, contacting the inlet gas stream of the fuel cell with a first side of a second membrane electrode assembly, and/or contacting the inlet gas stream with an inlet of a flow field plate of a fuel cell. The inlet gas stream can contact the flow field plate inlet in parallel with the first side of the membrane electrode assembly.

Other advantages and features of the invention will be understood from the figures, detailed description and claims.

DETAILED DESCRIPTION

Figure 1:
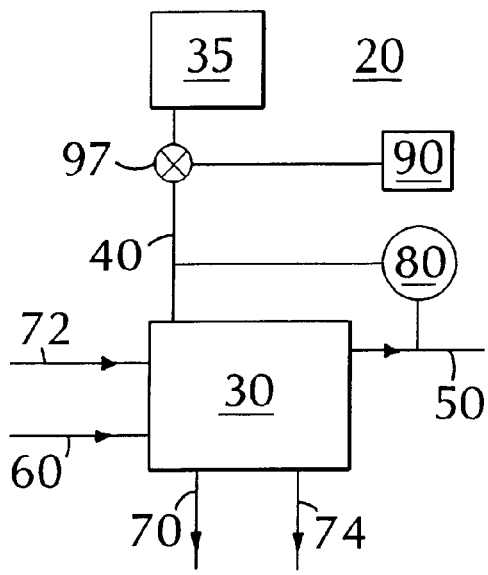
FIG. 1 is a schematic diagram of an embodiment of a fuel cell system having a sensor.
Figure 2:
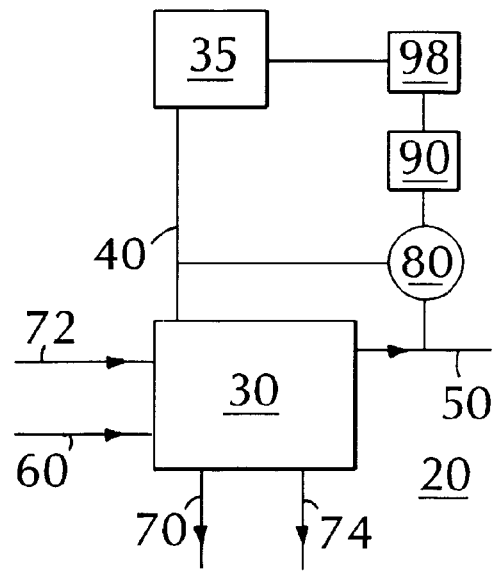
FIG. 2 is a schematic diagram of an embodiment of a fuel cell system having a sensor.
Figure 3:
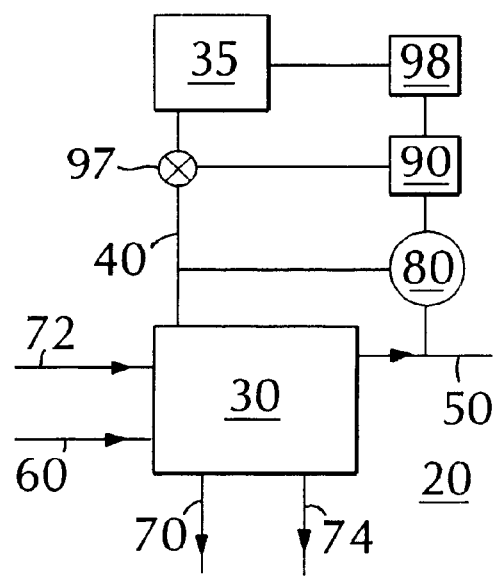
FIG. 3 is a schematic diagram of an embodiment of a fuel cell system having a sensor.

FIG. 1 shows a fuel cell system 20 having a fuel cell stack 30, an anode gas supply 35, an anode gas inlet line 40, an anode gas outlet line 50, a cathode gas inlet line 60, a cathode gas outlet line 70, a coolant inlet line 72, and a coolant outlet line 74. Fuel cell system 20 also includes a sensor 80 in fluid communication with gases flowing through lines 40 and 50. Sensor 80 is also in electrical communication with a controller 90, which regulates the flow of anode gas flowing in inlet 40 from anode gas supply 35 to fuel cell stack 30. As shown in FIG. 1, this can be achieved, for example, by interfacing controller 90 with a valve 97, located along anode gas inlet 40, so that valve 97 can control the flow of anode gas flowing in inlet 40 FIG. 2 shows an alternate configuration in which controller 90 is interfaced with a blower 98 that regulates feed gas into reformer 35, which, in turn, controls the anode gas output from anode gas supply 35 to fuel cell stack 30. FIG. 3 shows still another embodiment of system 20 having both valve 97 and blower 98.

Sensor 80 detects the concentrations of hydrogen in the gases flowing in anode gas inlet and outlet lines 40 and 50. The difference in hydrogen concentration in lines 40 and 50 is measured as a potential difference (e.g., voltage) and transmitted to controller 90, (e.g., a computer). In response to the measured voltage, controller 90 regulates the position of valve 97 (e.g., how much valve 97 is open) and/or the throughput of blower 98 (e.g., how much feed gas flows into anode gas supply 35 in a given time period), which, in turn, regulates the flow of anode gas from gas supply 35 to anode gas inlet line 40. These arrangements can be used, for example, to adjust the amount of anode gas flowing through line 40 and into fuel cell stack 30 based on the amount of hydrogen needed or desired to operate stack 30.

Figure 4:
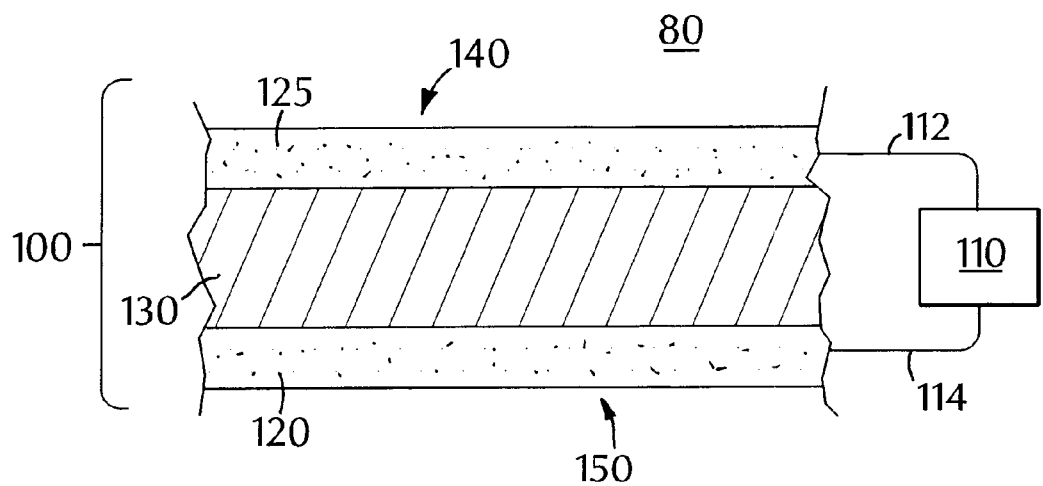
FIG. 4 is a cross-sectional view of an embodiment of a sensor.

FIG. 4 shows an embodiment of sensor 80 having a membrane electrode assembly (MEA) 100 in electrical communication with a detector 110 (e.g., a voltmeter) via electrical leads 112 and 114. MEA includes catalyst layers 120 and 125 and a solid electrolyte 130 between layers 120 and 125. Inlet side 40 of MEA 100 is in fluid communication with anode gas inlet line 40, and outlet side 150 of MEA 100 is in fluid communication with anode gas outlet line 50.

Electrolyte 130 should be capable of allowing ions to flow therethrough while providing a substantial resistance to the flow of electrons. In some embodiments, electrolyte 130 is a solid polymer (e.g., a solid polymer ion exchange membrane), such as a solid polymer proton exchange membrane (e.g., a solid polymer containing sulfonic acid groups). Such membranes are commercially available from E.I. DuPont de Nemours Company (Wilmington, DE) under the trademark NAF10N. Alternatively, electrolyte 130 can also be prepared from the commercial product GORE-SELECT, available from W.L. Gore & Associates (Elkton, Md.)

Catalyst layers 120 and 125 can be formed of a material capable of interacting with hydrogen to form protons and electrons. Examples of such materials include, for example, platinum, platinum alloys, and platinum dispersed on carbon black. Alternatively, a suspension is applied to the surfaces of gas diffusion layers (described below) that face solid electrolyte 130, and the suspension is then dried. During the preparation of MEA 100, catalyst material (e.g., platinum) can be applied to electrolyte 130 using standard techniques. The method of preparing layers 120 and 125 may further include the use of pressure and temperature to achieve bonding.

Hydrogen in anode gas inlet and outlet lines 40 and 50 interacts with catalyst layers 120 and 125 to form protons and electrons. Generally, different concentrations of hydrogen produce different amounts of protons and electrons. A difference in the concentration of hydrogen at inlet side 140 and outlet side 150 creates a potential difference (e.g., voltage) between leads 112 and 114. As described below, since the concentration of hydrogen in anode gas inlet line 40 is typically known, the measured voltage can be calibrated and correlated to hydrogen concentrations in anode gas outlet line 50. Therefore, the potential difference between lines 112 and 114 can be measured and used to determine the partial pressure (and the concentration) of hydrogen in anode gas outlet line 50. For instance, by applying the Nernst equation and using the known concentration of hydrogen in anode gas inlet line 40 as a reference, the measured voltage can be used to determine the concentration of hydrogen in anode gas outlet line 50:

$$E = E_o + \frac{RT}{nF} \log \frac{p_1}{p_2}$$

where E=measure voltage;
$E_o$=equilibrium potential
R=universal gas constant;
T=temperature
n=number of electrons transferred;
F=Faraday constant;
$p_1$=partial pressure of hydrogen in the anode gas inlet line; and
$p_2$=partial pressure of hydrogen in the anode gas outlet line.

For example, suppose fuel cell system 20 can operate optimally with anode gas inlet 40 having 40% excess hydrogen and anode gas outlet 50 having 5% hydrogen. Outlet stream 50 has some level of hydrogen concentration because, for example, excess hydrogen is added to inlet 40 to ensure that all of the fuel cells in fuel cell stack 30 are exposed to enough hydrogen, since the amount of hydrogen that is reacted may vary between different fuel cells. Thus, if the detected potential difference corresponds to a hydrogen concentration in outlet line 50 of less than 5%, then fuel cell system 20 is running too lean. In this case, the potential across leads 112 and 114 causes detector 110 to send a signal to controller 90, which, in turn, sends a signal to valve 97, causing valve 97 to open more, and/or to blower 98, to increase the input of feed gas to anode gas supply 35. This increases the flow of anode gas through line 40, and more hydrogen is added to inlet line 40 to ensure that all the fuel cells are contacted with enough hydrogen. If the detected potential difference corresponds to a hydrogen concentration in outlet line 50 of more than 5%, then fuel cell system 20 is running too hydrogen rich and over-burdening the fuel cells. In this case, the potential across leads 112 and 114 causes detector 110 to send a signal to controller 90, which, in turn, sends a signal to valve 97, causing valve 97 to open less, and/or to blower 98, to decrease the input of feed gas to anode gas supply 35. This decreases the flow of anode gas through line 40, and less hydrogen is added to inlet line 40 to minimize waste.

Figure 5:
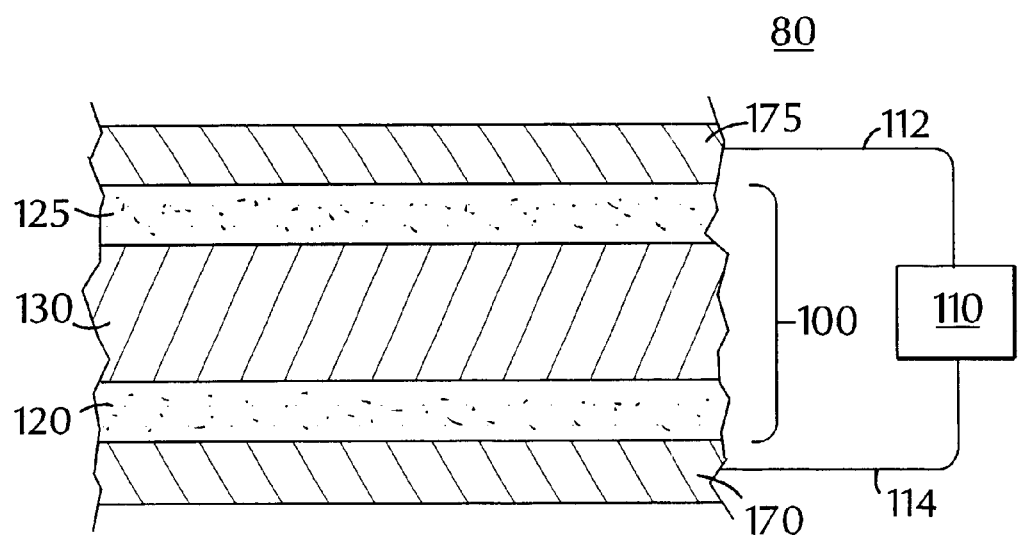
FIG. 5 is a cross-sectional view of another embodiment of a sensor.

FIG. 5 shows another embodiment of sensor 80 that further includes electrically conductive layers 170 and 175 adjacent the exterior of catalyst layers 120 and 125, respectively. In general, layers 170 and 175 can provide sensor 80 with enhanced strength and/or enhanced electrical contact to detector 110. Electrically conductive layers 170 and 175 each can include, for example, a gas diffusion layer (GDL) and/or a metal screen. In embodiments in which layers 170 and 175 include GDLs, the GDLs can be formed of a material that is both gas and liquid permeable (e.g., by infusing a porous carbon black cloth or paper with a slurry of carbon black followed by sintering with a polytetrafluoroethylene material) so that the anode gas (e.g., hydrogen) can pass therethrough. In embodiments in which layers 170 and 175 include metal screen(s), the metal screen(s) can be formed of (e.g., nickel and stainless steel). The metal screens can be in place of or adjacent to exterior surfaces of the GDLs.

Figure 6:
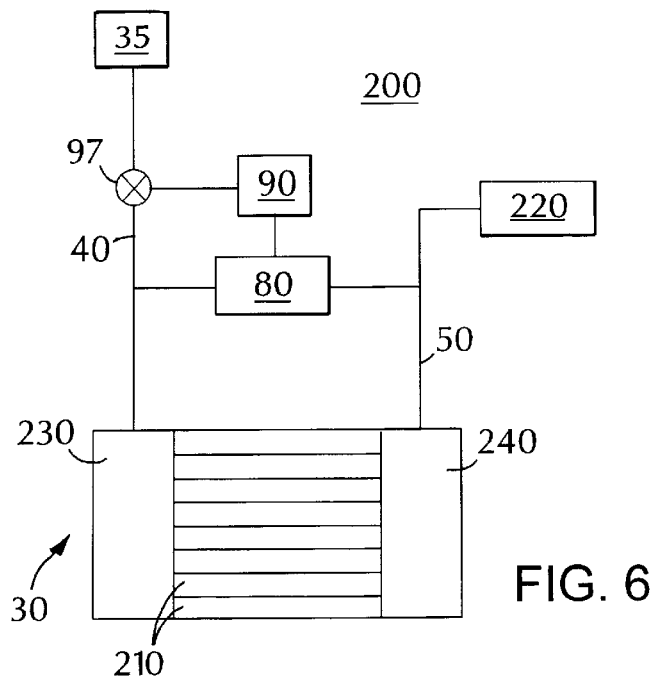
FIG. 6 is a schematic diagram of an embodiment of a fuel cell system having a sensor.

FIG. 6 shows an embodiment of a fuel cell system 200 that includes sensor 80, controller 90, valve 97, an anode gas supply 35 (e.g., a reformer), a fuel cell stack 30 having a plurality of fuel cells 210, and an anode tailgas oxidizer 220. Anode gas supply 35 supplies anode gas to fuel cell stack 30 through anode gas inlet line 40. Anode gas flows from anode gas inlet line 40 into anode inlet manifold 230, through individual fuel cells 210 (described below), and into anode outlet manifold 240. .Anode gas then flows through anode outlet line 50 and to anode tailgas oxidizer 220, where anode gas is consumed to provide energy (e.g., to the reformer). While the embodiment of system 200 shown in FIG. 6 has valve 97, other embodiments of system 200 are also contemplated. For example, system 200 can include blower 98 with or without valve 97.

Figure 7:
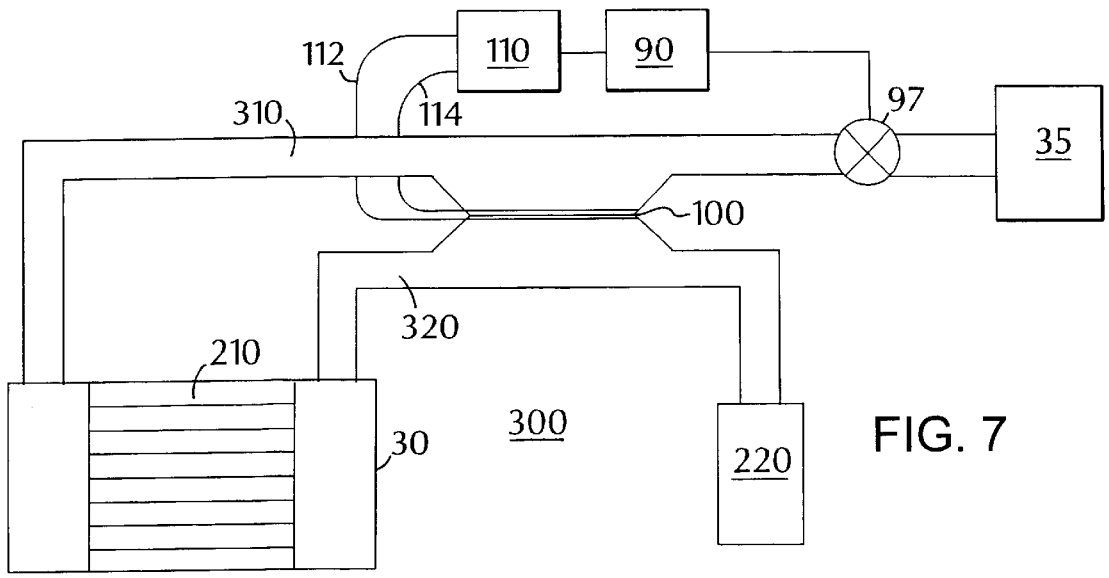
FIG. 7 is a schematic diagram of an embodiment of a fuel cell system having a sensor.

FIG. 7 shows an embodiment of a fuel cell system 300 in which MEA 100 of sensor 80 is interfaced with anode gas inlet and outlet conduits 310 and 320 such that inlet side 140 of MEA 100 defies a portion of inlet conduit 310, and outlet side 150 of MEA 100 defines a portion of outlet conduit 320. As with the embodiments described above, catalyst layers 120 and 125 of the MEA 100 (or the GDLs and/or the metal screens) can be electrically connected to detector 110, which is connected to controller 90 interfaced with valve 97. While the embodiment of system 300 shown in FIG. 7 has valve 97, other embodiments of system 300 are also contemplated. For example, system 300 can include blower 98 with or without valve 97.

FIGS. 8–11 show embodiments of fuel cell stacks wherein MEA 100 is located in fuel cell stack 30 to improve the response time of sensor 80. As described above, MEA 100 is electrically connected to detector 110. Fuel cell stack 30 includes a plurality of fuel cells 210 (described below) arranged so that the flow of anode gas through cells 210 is in parallel. Collector plates 400 are provided to collect electrons from fuel cells 210 to an external load 410. Fuel cell stack 30 is configured such that as anode gas is introduced to fuel cell stack 30 through anode inlet 420, anode gas contacts inlet side 140 of MEA 100.

Figure 8:
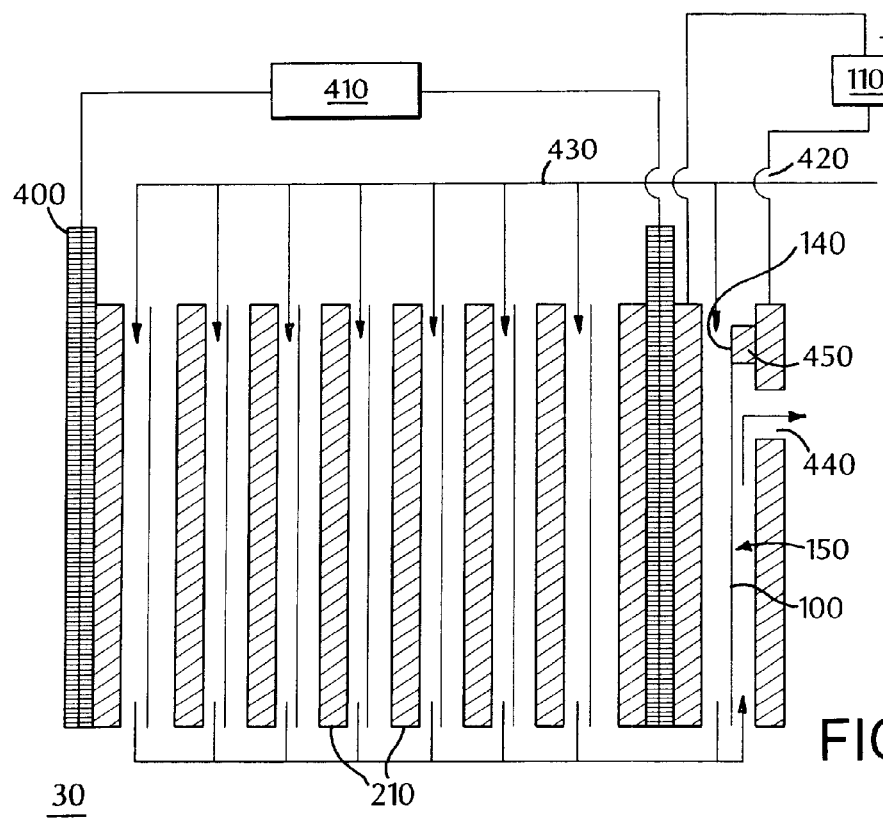
FIG. 8 is a cross-sectional view of an embodiment of a fuel cell stack having a sensor.
Figure 9:
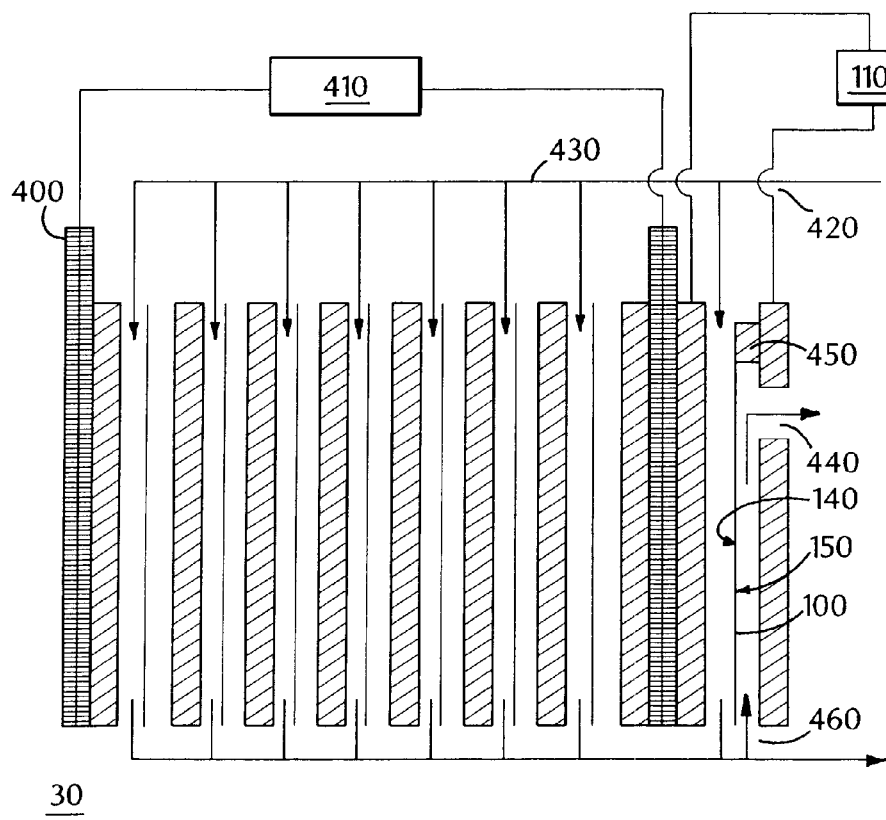
FIG. 9 is a cross-sectional view of an embodiment of a fuel cell stack having a sensor.

FIG. 8 shows an embodiment of fuel cell stack 30 in which the anode gas contacts inlet side 140 of MEA 100 in parallel with fuel cells 210. Fuel cell stack 30 is further configured such that anode gas flowing along flow path 430 contacts outlet side 150 of MEA 100 as anode gas exits fuel cell stack 30 through anode gas outlet 440. As shown in FIG. 8, fuel cell stack 30 can include a blocking member 450 for preventing gas flowing along path 430 from contacting outlet side 150 of MEA 100 before gas contacts fuel cells 210. FIG. 9 shows an embodiment in which fuel cell stack 30 further includes a second anode gas outlet 460.

Figure 10:
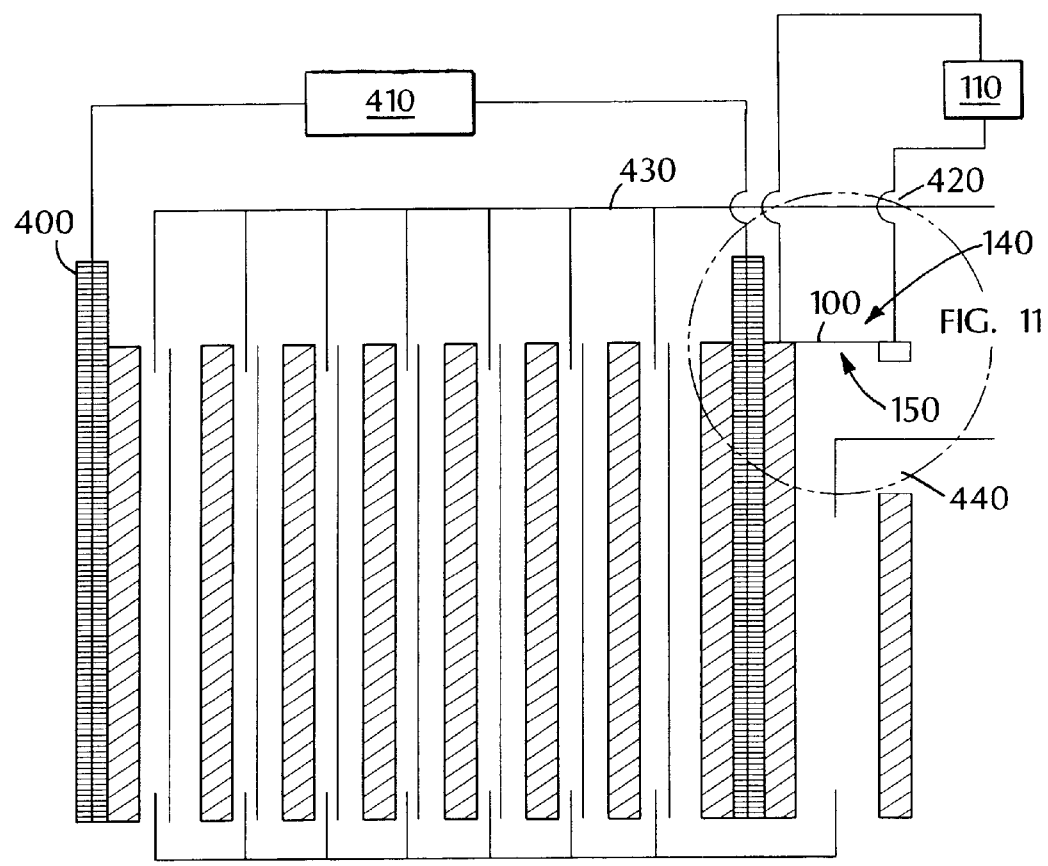
FIG. 10 is a cross-sectional view of an embodiment of a fuel cell stack having a sensor.
Figure 11:
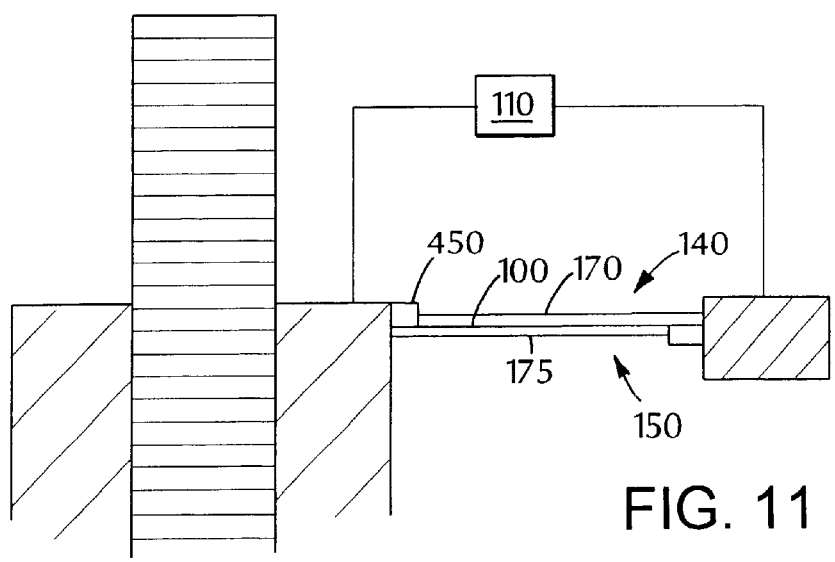
FIG. 11 is a cross-sectional view of a portion of the fuel cell stack and sensor of FIG. 10.

FIGS. 10 and 1 show an embodiment of a fuel cell stack 30 having an alternate arrangement of MEA 100 wherein anode gas flowing through anode inlet 420 and along flow path 430 contacts inlet side 140 of MEA 100 before contacting fuel cells 210. After contacting fuel cells 210, anode gas contacts outlet side 150 of MEA 100 and exits fuel cell stack 30 through anode outlet 440. Fuel cell stack 30 can include appropriate insulating members 450 to prevent MEA 100 from short circuiting.

Figure 12:
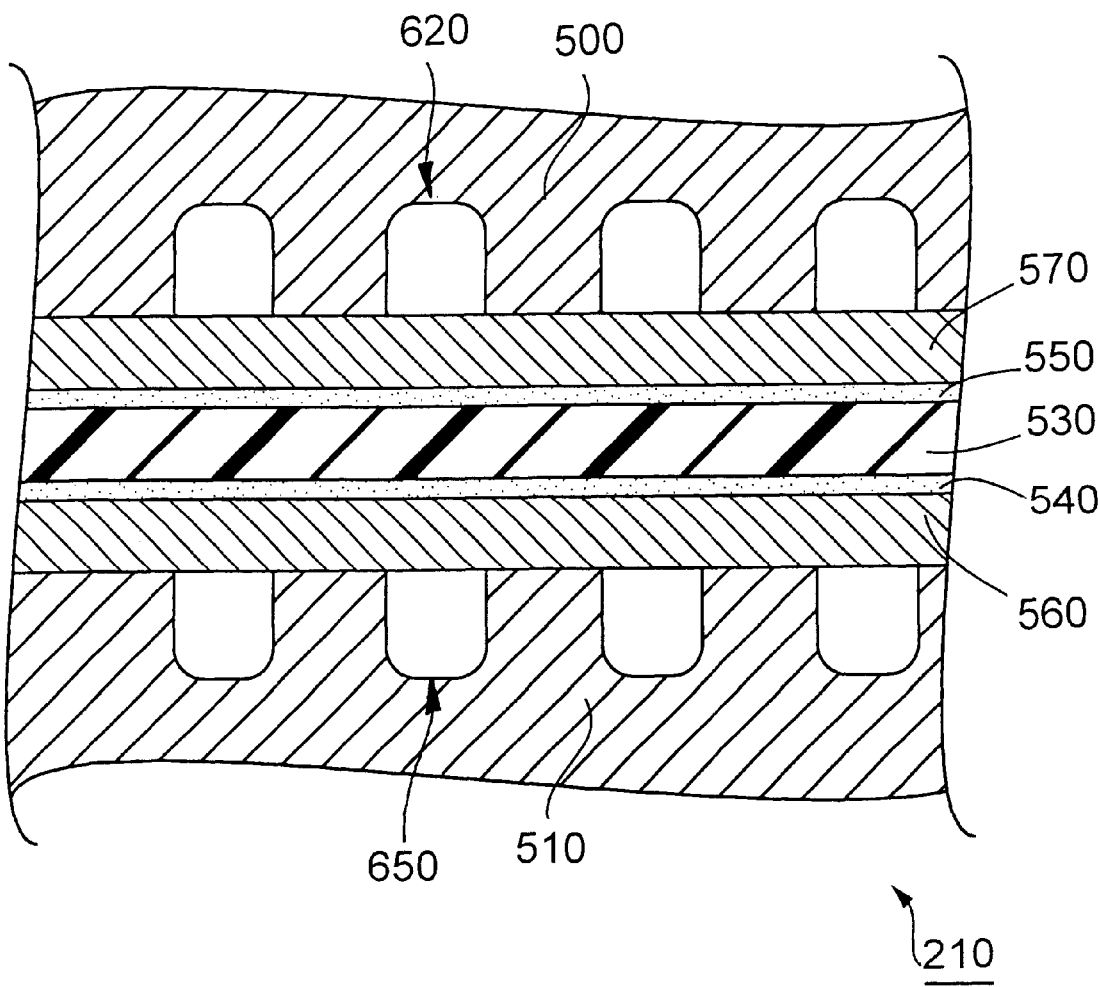
FIG. 12 is a cross-sectional view of an embodiment of a fuel cell.

Referring back to FIG. 6, fuel cell stack 30 includes a plurality of fuel cells 210 designed to catalyze the fuel cell reaction. FIG. 12 shows a partial cross-section of fuel cell 210 that includes a cathode flow field plate 500, an anode flow field plate 510, a solid electrolyte 530, catalyst layers 540 and 550, and gas diffusion layers 560 and 570. Fuel cells 210 can be arranged by having the back surface of a cathode flow field plate of one fuel cell serve as the anode flow field plate in the next fuel cell. A plurality of coolant flow field plates (described below) can also be used in this arrangement.

Electrolyte 530 is generally as described above with respect to electrolyte 130.

Catalyst layer 540 is generally as described above with respect to catalyst layers 120 and 125.

Catalyst layer 550 can be formed of a material capable of interacting with oxygen, electrons and protons to form water. Examples of such materials include, for example, platinum, platinum alloys, and noble metals dispersed on carbon black. Catalyst layer 550 can be prepared as described above with respect to catalyst layers 120 and 125.

Gas diffusion layers 560 and 570 are typically formed of a material as described above with respect to GDLs of electrically conductive layers 170 and 175. In addition, gas diffusion layers 560 and 570 should be electrically conductive so that electrons can flow from catalyst layer 540 to flow field plate 510 and from flow field plate 500 to catalyst layer 550.

Figure 13:
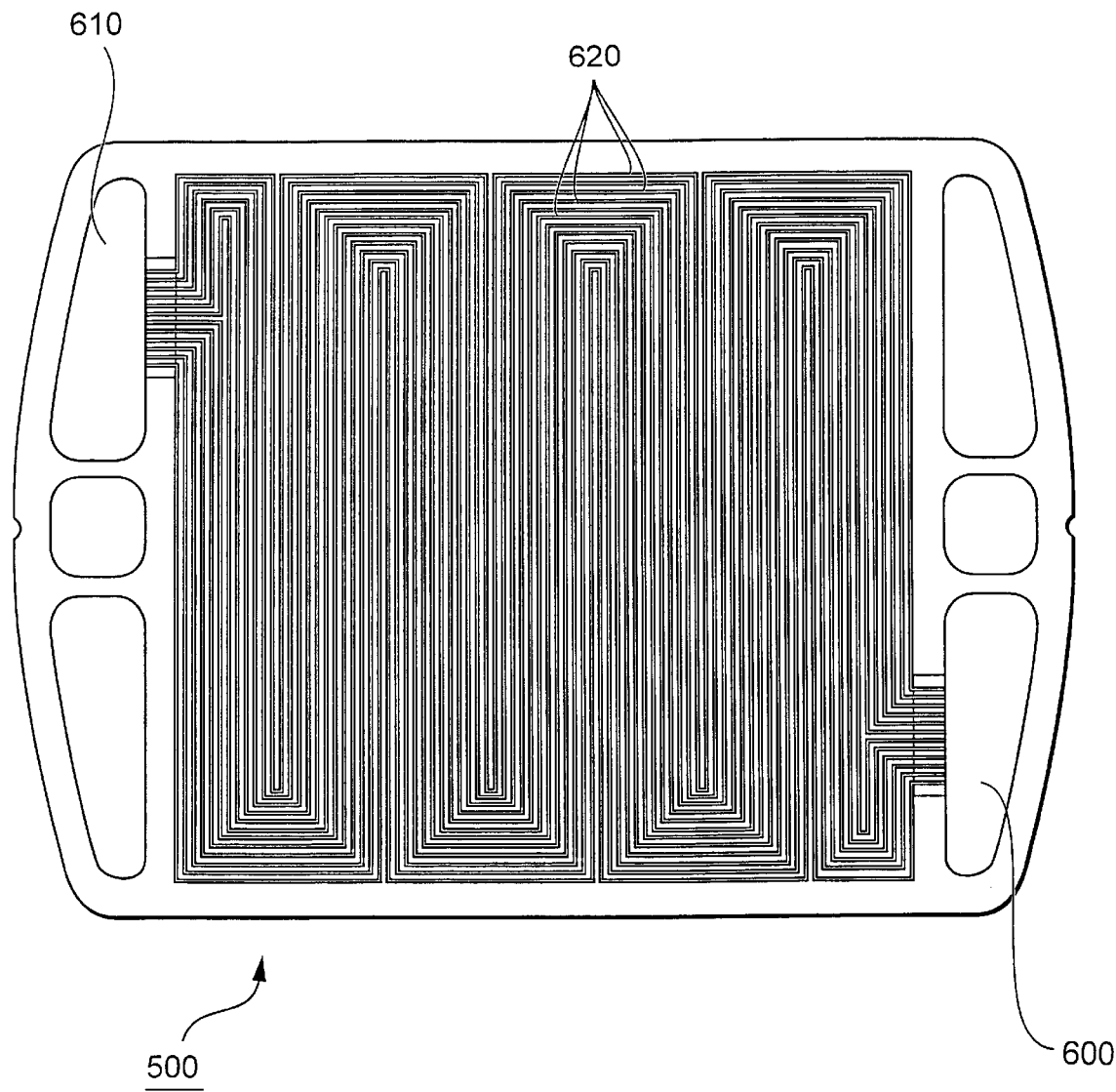
FIG. 13 is an elevational view of an embodiment of a cathode flow field plate.

FIG. 13 shows a cathode flow field plate 500 having an inlet 600, an outlet 610, and open-faced channels 620 that define a flow path for a cathode gas from inlet 600 to outlet 610. A cathode gas flows from cathode gas inlet line 60 and enters flow field plate 500 via inlet 600. The cathode gas then flows along channels 620 and exits flow field plate 500 via outlet 610. As the cathode gas flows along channels 620, oxygen contained in the cathode gas can permeate gas diffusion layer 570 and interact with catalyst layer 550. Electrons and protons present at layer 570 react with the oxygen to form water. The water can pass back through diffusion layer 570, enter the cathode gas stream in channels 620, and exit plate 500 through cathode flow field plate outlet 610.

Figure 14:
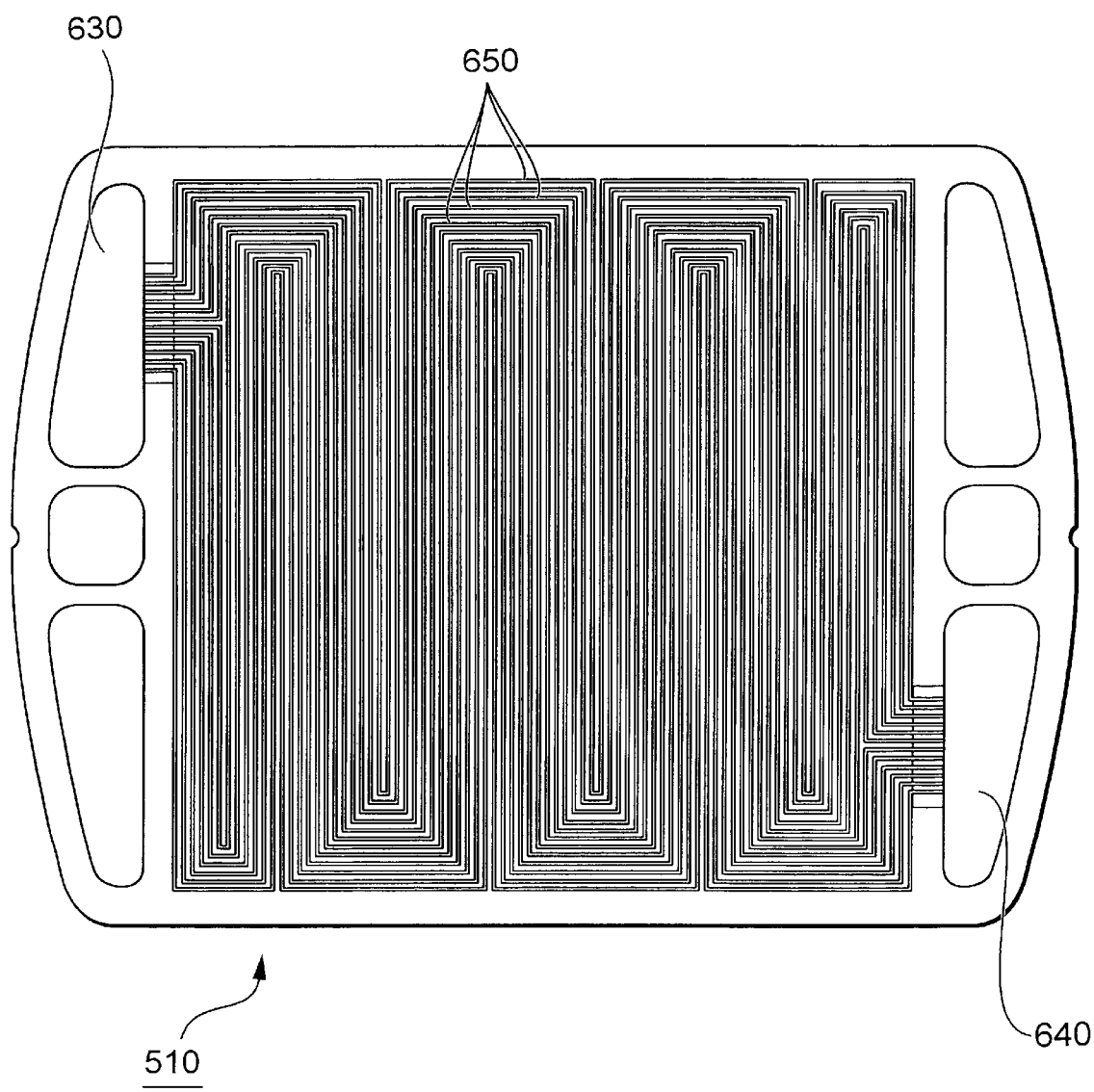
FIG. 14 is an elevational view of an embodiment of an anode flow field plate.

FIG. 14 shows an anode flow field plate 510 having an inlet 630, an outlet 640, and open-faced channels 650 that define a flow path for an anode gas from inlet 630 to outlet 640. An anode gas flows from the anode gas inlet line 40 and enters flow field plate 510 via inlet 630. The anode gas then flows along channels 650 and exits flow field plate 510 via outlet 640. As the anode gas flows along channels 650, hydrogen contained in the anode gas can permeate gas diffusion layer 560 and interact with catalyst layer 540 to form protons and electrons. The protons pass through solid electrolyte 530, and the electrons are conducted through gas diffusion layer 560 to anode flow field plate 510, ultimately flowing through an external load to cathode flow field plate 500.

Figure 15:
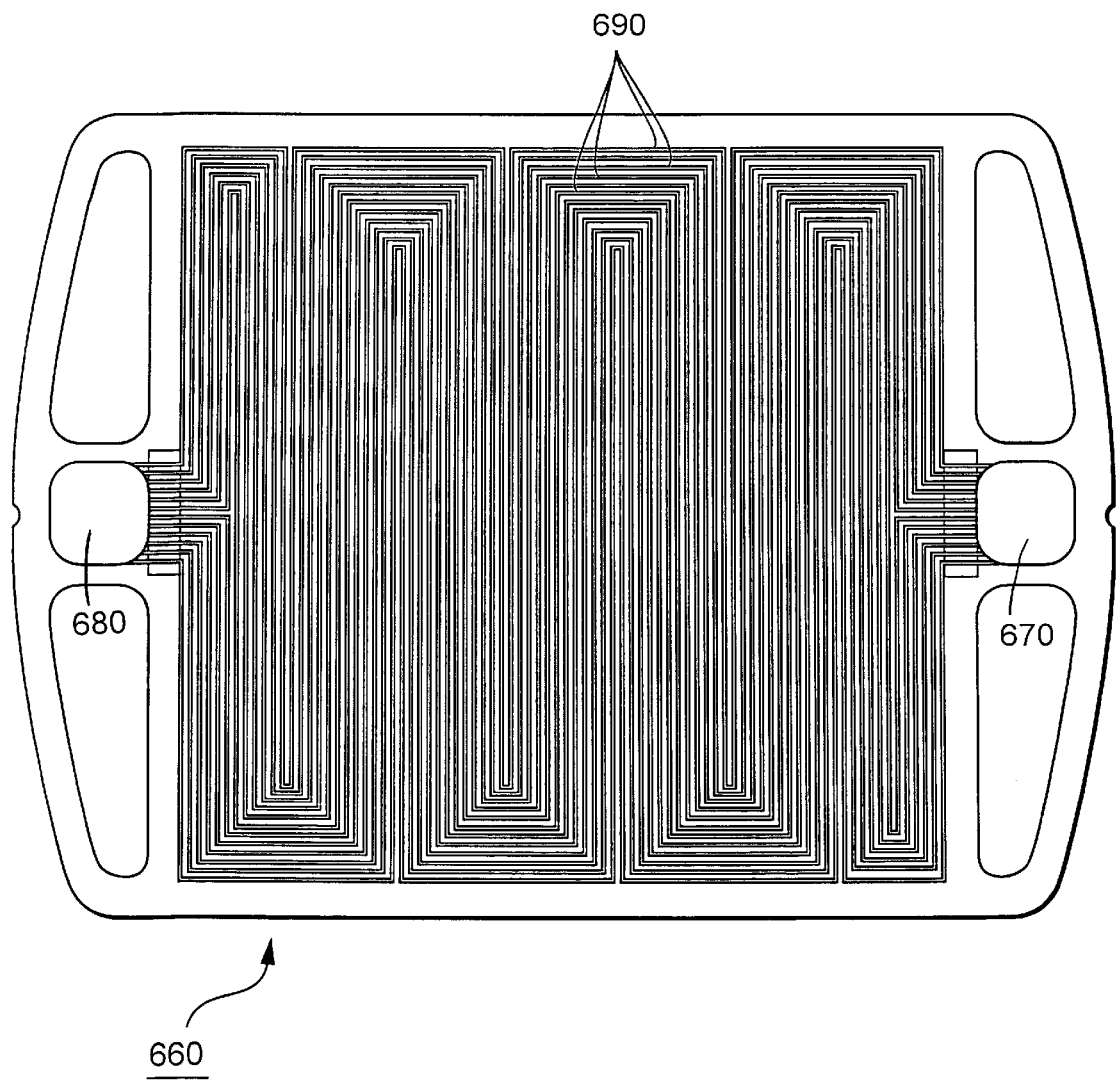
FIG. 15 is an elevational view of an embodiment of a coolant flow field plate.

Heat produced during the fuel cell reaction is removed from fuel cell 210 by flowing a coolant through fuel cell 210 via a coolant flow field plate. FIG. 15 shows a coolant flow field plate 660 having an inlet 670, an outlet 680 and open-faced channels 690 that define a flow path for coolant from inlet 670 to outlet 680. The coolant enters fuel cell 210 from coolant inlet line 72 via inlet 670, flows along channels 690 and absorbs heat, and exits fuel cell 210 via outlet 680 to coolant outlet line 74.

Fuel cells 210 are arranged within fuel cell stack 30 such that inlets 630 are configured to be in fluid communication with anode inlet manifold 230 and anode gas inlet line 40. Outlets 640 are configured to be in fluid communication with anode outlet manifold 240 and anode gas outlet line 50. Accordingly, a first side of MEA 100 (e.g., an inlet side) is also in fluid communication with inlets 630; and a second side of MEA 100 (e.g., an outlet side) is also in fluid communication with outlets 640.

Other embodiments and arrangements of the flow field plates described above can also be used. For example, other embodiments are disclosed in commonly assigned U.S. patent application No. 09/168,232, now U.S. Pat No. 6,015,633 entitled "Fuel Cell Assembly Unit for Promoting Fluid Service and Design Flexibility", which is hereby incorporated by reference.

Other embodiments of the above-described fuel cell systems are possible. For example, to improve the signal-to-noise ratio of the detected potential difference, the above-described fuel cell systems can include a plurality of MEAs arranged in series and connected to a detector. For example, instead of detecting a potential difference of 0–18 mV by using only one MEA, a potential difference of 0–180 mV can be detected by having 10 MEAs arranged in series. Instead of measuring voltage, current flow can be measured between the sides of the MEA. Furthermore, while the above-described sensor was described for use with hydrogen on the anode side of the fuel cell system, by selecting appropriate catalyst layers, other embodiments of the sensor can be used for other reactants and products, and for the cathode side of the fuel cell system.

Other embodiments are in the claims.

What is claimed is:

1. A fuel cell system comprising:
    a fuel cell comprising:
        flow field plate having an inlet and an outlet; and
    a first sensor comprising:
        a membrane electrode assembly having a first side in fluid communication with the flow field plate inlet of the fuel cell, and a second side in fluid communication with the flow field plate outlet of the fuel cell, the second side of the membrane electrode assembly different than the first side of the membrane electrode assembly; and
        a detector in electrical communication with the first and second sides of the membrane electrode assembly, the detector adapted to detect a difference between a hydrogen concentration at the first side of the membrane electrode assembly and a hydrogen concentration at the second side of the membrane electrode assembly.

2. The fuel cell system of claim 1, wherein the membrane electrode assembly comprises:
    a first catalyst layer;
    a second catalyst layer; and
    a solid electrolyte between the first and second catalyst layers.

3. The fuel cell system of claim 2, further comprising:
    a first gas diffusion layer; and
    a second gas diffusion layer,
    wherein the first catalyst layer is between the first gas diffusion layer and the solid electrolyte, and the second catalyst layer is between the second gas diffusion layer and the solid electrolyte.

4. The fuel cell system of claim 2, wherein the first and second catalyst layers comprise platinum.

5. The fuel cell system of claim 1, further comprising:
    a fuel supply system in fluid communication with the inlet of the flow field plate; and
    a controller adapted to regulate flow of fuel from the fuel supply system to the inlet of the flow field plate in response to a signal from the first sensor.

6. The fuel cell system of claim 5, further comprising:
    a valve in fluid communication with the inlet of the flow field plate,
    wherein the controller is interfaced to control the position of the valve in response to a signal from the first sensor.

7. The fuel cell system of claim 5, wherein the fuel supply system comprises a reformer in fluid communication with the inlet of the flow field plate.

8. The fuel cell system of claim 1, further comprising a second sensor connected in series to the first sensor.

9. The fuel cell system of claim 1, further comprising:
    an inlet conduit in fluid communication with the inlet of the flow field plate; and
    an outlet conduit in fluid communication with the outlet of the flow field plate,
    wherein the first side of the membrane electrode assembly defies a portion of the inlet conduit, and the second side of the membrane electrode assembly defines a portion of the outlet conduit.

10. The fuel cell system of claim 9, further comprising:
    a gas source in fluid communication with the inlet of the flow field plate through the inlet conduit.

11. The fuel cell system of claim 9, further comprising:
    a tailgas oxidizer in fluid communication with the outlet of the flow field plate through the outlet conduit.

12. A fuel cell system comprising:
    a fuel cell stack comprising:
        a first fuel cell comprising:
            a first flow field plate having an inlet and an outlet;
        a second fuel cell comprising:
            a second flow field plate having an inlet in fluid communication with the inlet of the first flow field plate, and an outlet in fluid communication with the outlet of the first flow field plate; and
    a first sensor comprising:
        a membrane electrode assembly having a first side in fluid communication with the inlets of the first and second flow field plates, and a second side in fluid communication with the outlets of the first and second flow field plates, the second side of the membrane electrode assembly different than the first side of the membrane electrode assembly; and
        a detector in electrical communication with the first and second sides of the membrane electrode assembly, the detector adapted to detect a difference in a hydrogen concentration at the first side of the membrane electrode assembly and a hydrogen concentration at the second side of the membrane electrode assembly.

13. The fuel cell system of claim 12, wherein the membrane electrode assembly comprises:
    a first catalyst layer;
    a second catalyst layer; and
    a solid electrolyte between the first and second catalyst layers.

14. The fuel cell system of claim 13, further comprising:
    a first gas diffusion layer; and
    a second gas diffusion layer,
    wherein the first catalyst layer is between the first gas diffusion layer and the solid electrolyte, and the second catalyst layer is between the second gas diffusion layer and the solid electrolyte.

15. The fuel cell system of claim 13, wherein the first and second catalyst layers comprise platinum.

16. The fuel cell system of claim 12, further comprising:
a fuel supply system in fluid communication with the inlets of the first and second flow field plates; and
a controller adapted to regulate flow of fuel from the fuel supply system to the inlets of the first and second flow field plates in response to a signal from the first sensor.

17. The fuel cell system of claim 16, further comprising:
a valve in fluid communication with the inlets of the first and second flow field plates,
wherein the controller is interfaced to control the position of the valve in response to a signal from the first sensor.

18. The fuel cell system of claim 16, wherein the fuel supply system comprises a reformer in fluid communication with the inlets of the first and second flow field plates.

19. The fuel cell system of claim 16, further comprising a second sensor connected in series to the first sensor.

20. The fuel cell system of claim 12, wherein the first side of the membrane electrode assembly is adapted to contact an inlet gas steam in parallel with the inlet gas stream contacting the inlets of the first and second flow field plates.

21. A method of regulating a gas flow in a fuel cell system, comprising:

contacting an inlet gas stream of the fuel cell with a first side of a membrane electrode assembly;

contacting an outlet gas stream of the fuel cell with a second side of the membrane electrode assembly; and detecting a difference between a hydrogen concentration at the first side of the membrane electrode assembly and a hydrogen concentration at the second side of the membrane electrode assembly.

22. The method of claim 21, further comprising:
regulating flow of the inlet gas stream based on the difference in the hydrogen activities of the first and second sides of the membrane electrode assembly.

23. The method of claim 21, further comprising:
contacting the inlet gas stream of the fuel cell with a first side of a second membrane electrode assembly.

24. The method of claim 21, further comprises contacting the inlet gas stream with an inlet of a flow field plate of a fuel cell, wherein the inlet gas stream contacts the inlet of the flow field plate in parallel with the first side of the membrane electrode assembly.

* * * * *